(12) United States Patent
Nosaka et al.

(10) Patent No.: US 7,452,281 B2
(45) Date of Patent: Nov. 18, 2008

(54) TORQUE TRANSMISSION DEVICE

(75) Inventors: Michiyasu Nosaka, Anjyo (JP); Kiyoshi Kurohata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/790,029

(22) Filed: Mar. 2, 2004

(65) Prior Publication Data

US 2004/0176200 A1    Sep. 9, 2004

(30) Foreign Application Priority Data

Mar. 3, 2003    (JP)    ............................. 2003-055590

(51) Int. Cl.
*F16D 7/02*    (2006.01)
(52) U.S. Cl. ....................... 464/32; 417/319
(58) Field of Classification Search ............ 464/32; 74/609; 403/2, 41; 417/319; 418/69; 474/70
See application file for complete search history.

(56) References Cited

U.S. PATENT DOCUMENTS

| | | | | |
|---|---|---|---|---|
| 2,739,463 | A | * | 3/1956 | Pfister et al. .................. 464/32 |
| 3,472,046 | A | * | 10/1969 | Potter .......................... 464/32 |
| 4,471,862 | A | * | 9/1984 | Sugita .................... 192/84.961 |
| 6,332,842 | B1 | * | 12/2001 | Tabuchi et al. ................. 403/41 |
| 6,802,779 | B2 | * | 10/2004 | Tabuchi et al. ................ 464/32 |
| 6,918,835 | B2 | * | 7/2005 | Aoki et al. ..................... 464/32 |
| 2002/0132673 | A1 | * | 9/2002 | Tabuchi et al. ................ 464/74 |
| 2002/0198056 | A1 | * | 12/2002 | Tabuchi et al. ................ 464/32 |

FOREIGN PATENT DOCUMENTS

| | | |
|---|---|---|
| JP | U-H04-84959 | 7/1992 |
| JP | A-2002-54711 | 2/2001 |
| JP | A-2002-349596 | 12/2002 |

* cited by examiner

*Primary Examiner*—Aaron M Dunwoody
(74) *Attorney, Agent, or Firm*—Posz Law Group, PLC

(57) ABSTRACT

A plate (13(*e*)), the outer diameter side of which is fixed to be integral with a plate section (13*c*), and which is provided with an engagement part (13*g*) to be engaged with a shoulder (13*f*) formed on the inner diameter side of a boss section (13*a*), is integral with a center hub (13). Thereby, even if a bridge section (13*d*) is broken and the plate section (3*c*) moves in the detachment direction of the center hub (13), the engagement part (13*g*) of the plate (13*e*) is engaged with the shoulder (13*f*) of the boss section (13*a*), whereby the plate section (13*c*) and the boss section (13a) are engaged and coupled with each other while interrupting the torque transmission. Accordingly, even if the bridge section (13*d*) is broken, the boss section (13*a*) as well as the plate section (13*c*) side are prevented from being detached from a pulley (10).

3 Claims, 6 Drawing Sheets

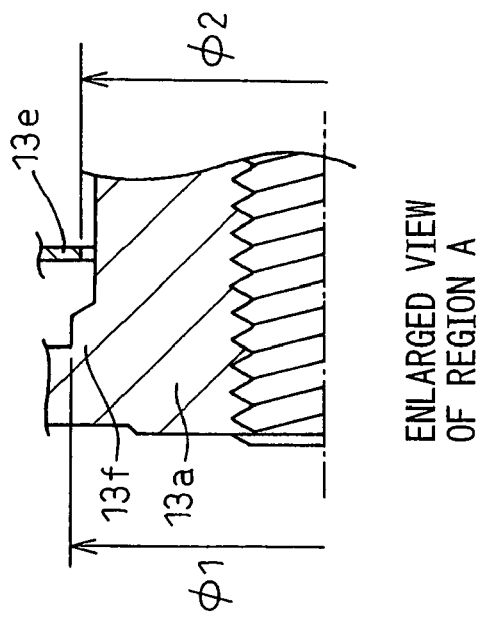
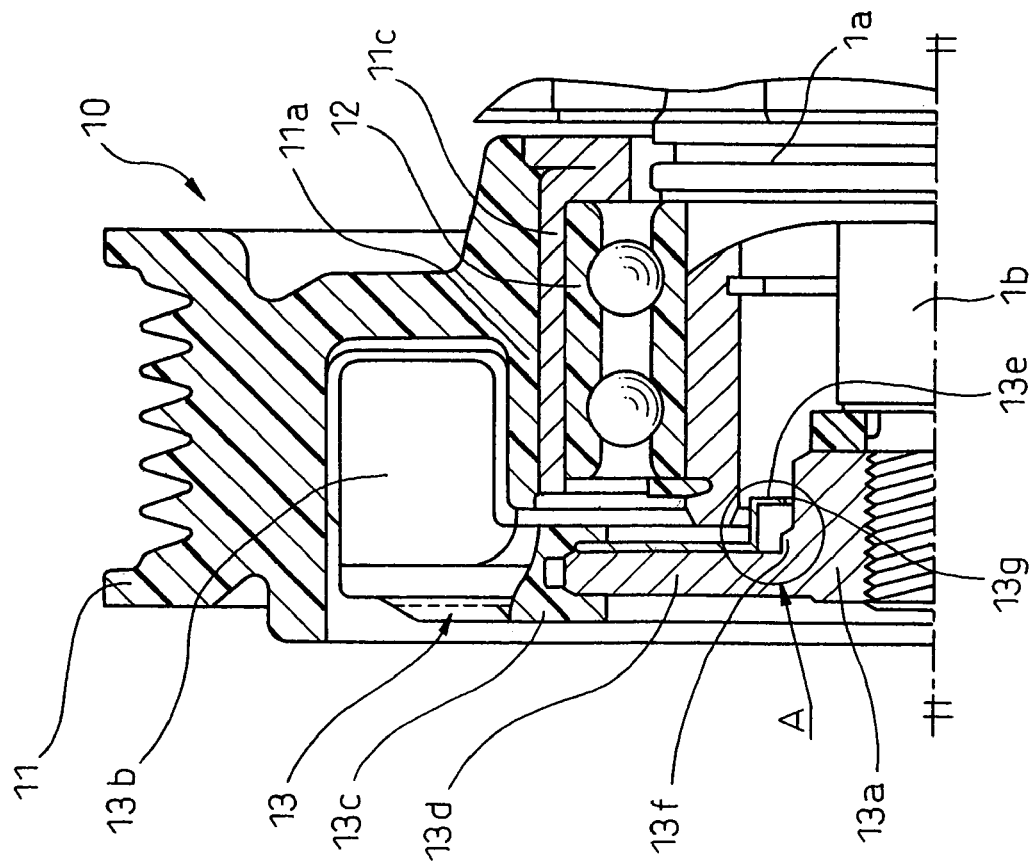

ROTARY DIRECTION OF PULLEY BODY

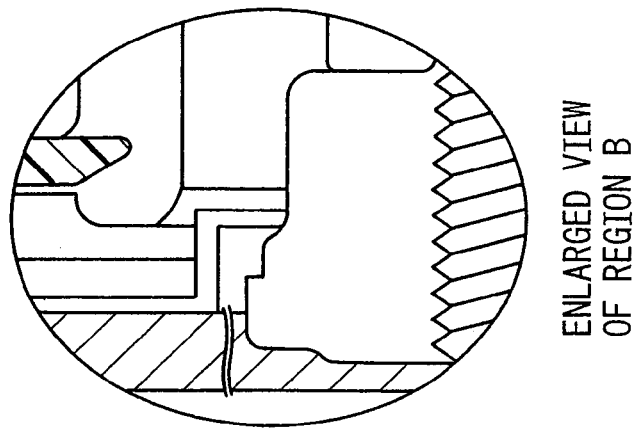
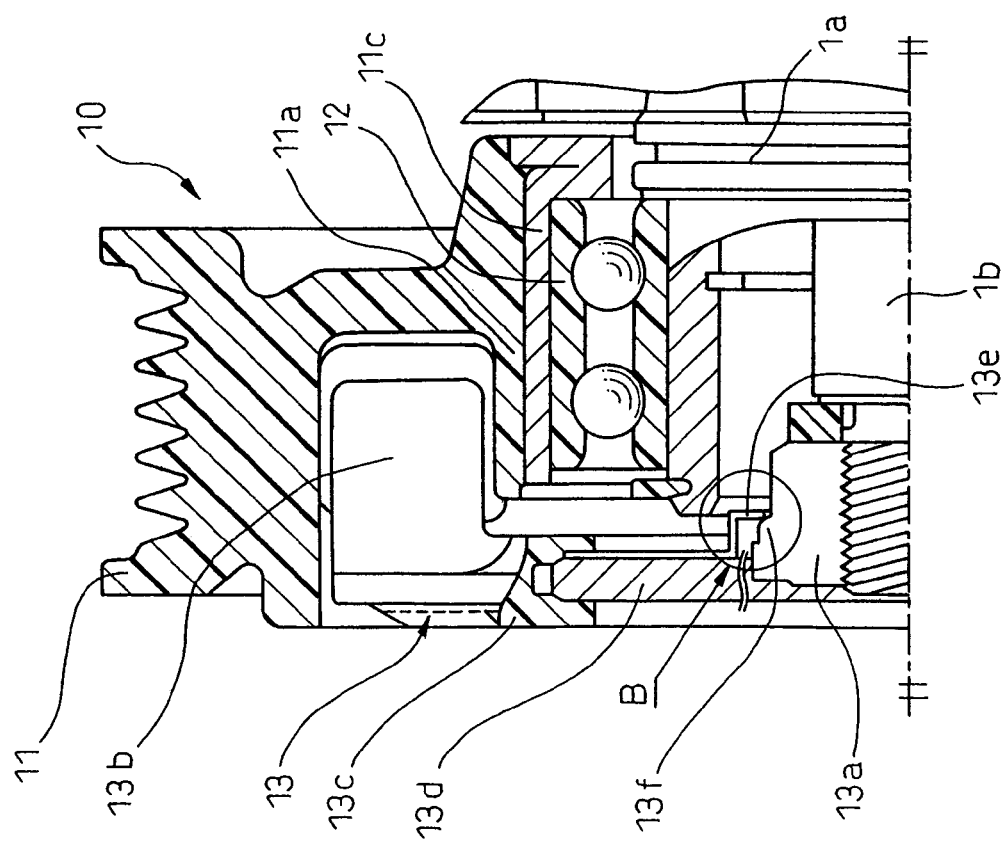

TORQUE TRANSMISSION DEVICE

BACKGROUND OF THE INVENTION

1. Field of the Invention

The present invention relates to a torque transmission device for transmitting a torque, generated by a driving source such as an engine, to a driven-side rotary machine (auxiliary machinery) such as a compressor.

2. Description of the Related Art

In the prior art, a torque transmission device for transmitting a power to a compressor includes an input section for receiving a torque from a driving machine, an output section coupled to a driven-side device, and a bridge section for coupling the input section and the output section with each other to transmit the torque from the input section to the output section. When the torque to be transmitted becomes larger than a predetermined value and the compressor is locked (not rotatable) due to a trouble such as seizure, the bridge section is broken to interrupt the torque transmission so that excessive load is not applied to an engine which is a drive source (for example, see Japanese Unexamined Patent Publication No. 2002-349596).

While a boss, which is the output section, is fixed to a shaft of the compressor by screws, the input section is structured solely by the combination of projections provided in the input section and a pulley, respectively. Thereby, there is a risk in that the input section may be detached from the torque transmission device, if the bridge section is broken.

To eliminate such a drawback, according to the invention described in Japanese Unexamined Patent Publication No. 2002-349596, a stop ring is attached to the pulley so that the input section is not detached from the torque transmission device when the bridge section is broken.

In this regard, according to the invention described in the above document, as the stop ring is attached to the pulley to prevent the input section from being detached from the torque transmission device, there are drawbacks in that a groove must be provided in the pulley for attaching the stop ring thereto and also a process is necessary for attaching the stop ring to the pulley during the assembly of the torque transmission device.

Accordingly, the invention described in the above document is problematic in that the reduction of the number of production processes is difficult for the production of the torque transmission device and the overhaul and maintenance thereof becomes difficult.

SUMMARY OF THE INVENTION

An object of the present invention is to provide a novel torque transmission device free from the above-mentioned drawbacks of the prior art, and another object is to prevent part of the torque transmission device from being detached therefrom without using a stop ring.

To achieve the above objects, according to one aspect of the present invention, a torque transmission device is provided, comprising an input section (13c) for receiving a torque from a driving machine, an output section (13a) coupled to the driven machine and a bridge section (13d) for coupling the input section (13c) to the output section (13a) to transmit the torque from the input section (13c) to the output section (13a); the bridge section (13d) being broken when the torque to be transmitted exceeds a predetermined value to interrupt the torque transmission, wherein retaining means (13e), at the breakage, fixed to one of the input section (13c) and the output section (13a) is provided for coupling the input section (13c) with the output section (13a) by the engagement with the other when the bridge section (13d) is broken.

Thereby, it is possible to contemplate a reduction of the number of processes necessary for the production of the torque transmission device and to ease the overhaul and maintenance thereof in comparison with the invention described in the above-mentioned patent document in which the detachment-preventing means is formed by a separate stop ring.

According to another aspect of the present invention, a torque transmission device is provided, wherein the output section (13a) is fixed to a rotary part of the driven machine to be integral therewith, the input section (13c) is intermeshed with a drive side rotary part (11) rotating by receiving the torque from the driving machine and is made to rotate together with the drive side rotary part (11), which intermeshed state is retained by a retaining force generated because the output section (13a) is formed integral with the rotary part, and the retaining means (13e) at the breakage is fixed with the input section (13c) side and engaged with the output section (13a) side when the bridge section is broken.

According to a further aspect of the present invention, a torque transmission device is provided and comprises an input section (13c) for receiving a torque from a driving machine, an output section (13a) coupled to the driven machine and a bridge section (13d) for coupling the input section (13c) to the output section (13a) to transmit the torque from the input section (13c) to the output section (13a); the bridge section (13d) being broken when the torque to be transmitted exceeds a predetermined value to interrupt the torque transmission, wherein retaining means (13e) at the breakage is provided for coupling the input section (13c) with the output section (13a) without contributing to the torque transmission between the input section (13c) and the output section (13a).

Thereby, it is possible to contemplate a reduction of the number of processes necessary for the production of the torque transmission device and to ease the overhaul and maintenance thereof in comparison with the invention described in the above-mentioned patent document in which the detachment-preventing means is formed by a separate stop ring.

The present invention may be more fully understood from the description of the preferred embodiments, as set forth below, together with the accompanying drawings.

BRIEF DESCRIPTION OF THE DRAWINGS

In the drawings,

FIG. 2A is an illustration of a pulley according to one embodiment of the present invention, and FIG. 2B is an enlarged view of a region A thereof;

FIG. 7A is an illustration for explaining the operation of the pulley according to this embodiment, and FIG. 7B is an enlarged view of a region B thereof.

DESCRIPTION OF THE PREFERRED EMBODIMENTS

Figure 1:
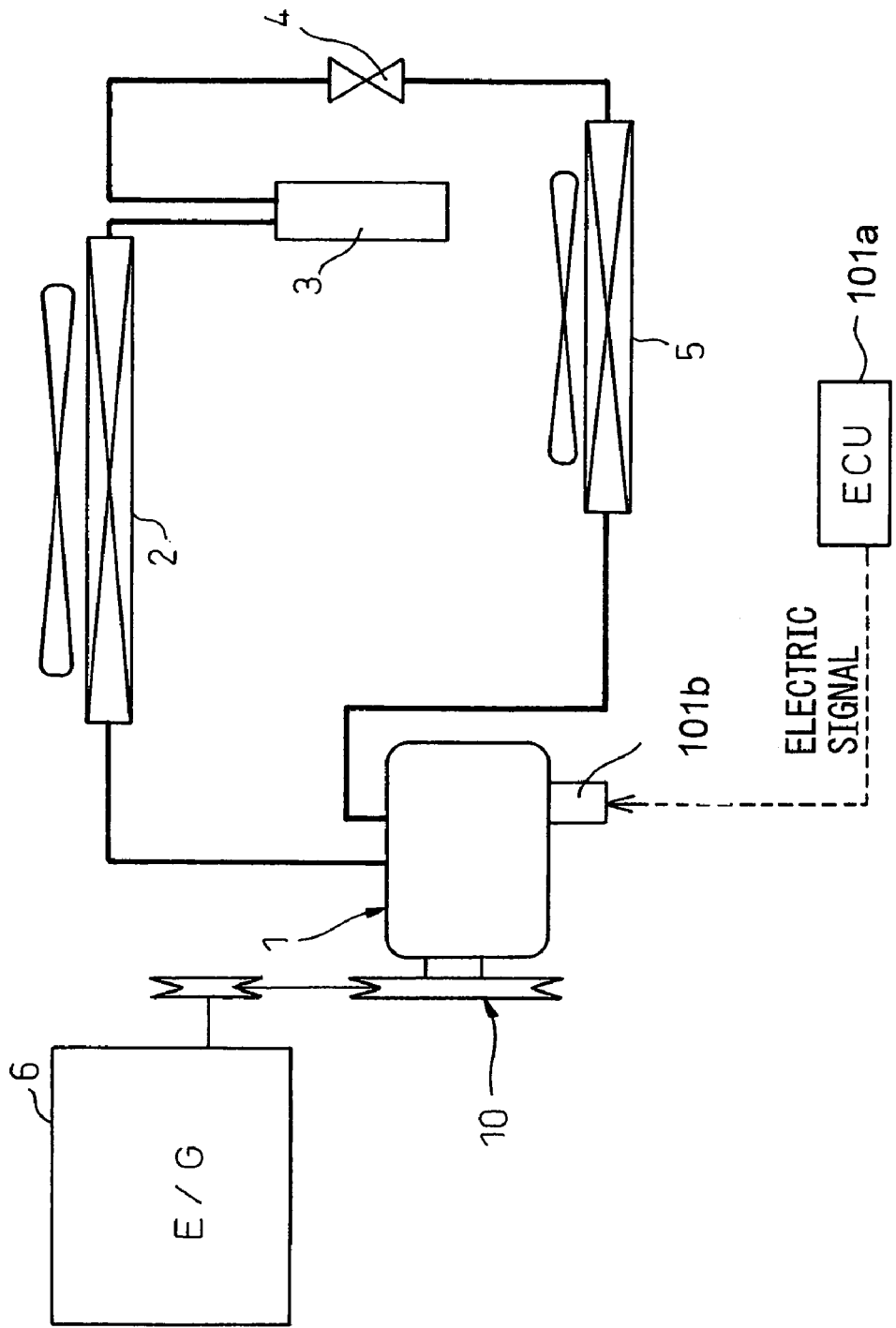
FIG. 1 is a schematic illustration of an air-conditioner (a vapor compression type refrigerator) for a vehicle.

According to this embodiment, the present invention is applied to a torque transmission device for transmitting a power from an engine for driving a vehicle to a compressor for an air-conditioner of the vehicle, wherein FIG. 1 is a schematic illustration of the air-conditioner (a vapor compression type refrigerator) for the vehicle.

In FIG. 1, a compressor 1 is of a variable displacement type for sucking and compressing refrigerant, a radiator 2 is a high-pressure side heat exchanger for cooling the refrigerant discharged from the compressor 1, and a receiver 3 is a gas-liquid separator for separating the refrigerant flowing out from the radiator 2 into a gas-phase refrigerant and a liquid-phase refrigerant.

In this regard, in the compressor 1 according to this embodiment, the displacement volume of the compressor, i.e., a theoretical displacement discharged when the shaft rotates once, is changed by varying an inclination angle of a swash plate for reciprocating a piston, wherein the inclination angle of the swash plate is changed by controlling a pressure in a swash plate chamber (a crank chamber) in which the swash plate is accommodated via a control valve 101b regulated by an electronic controller 101a.

a pressure reducer 4 is used for reducing a pressure of the refrigerant discharged from the receiver 3, and in this embodiment, a thermostatic expansion valve is adopted, in which the refrigerant is isenthalpically decompressed and a throttling degree is controlled so that a degree of superheat of the refrigerant sucked by the compressor 1 becomes a predetermined value. An evaporator 5 is a low-pressure side heat exchanger exhibiting a refrigerating capacity (a cooler capacity) by evaporating the refrigerant decompressed by the pressure reducer 4.

A pulley 10 is a torque transmission device of a pulley-integrated type (hereinafter referred to as a pulley) for transmitting a power of an engine 6, which is a drive source, to the compressor 1, which is a rotary machine, via a V-belt, and will be described in more detail below.

Figure 3:
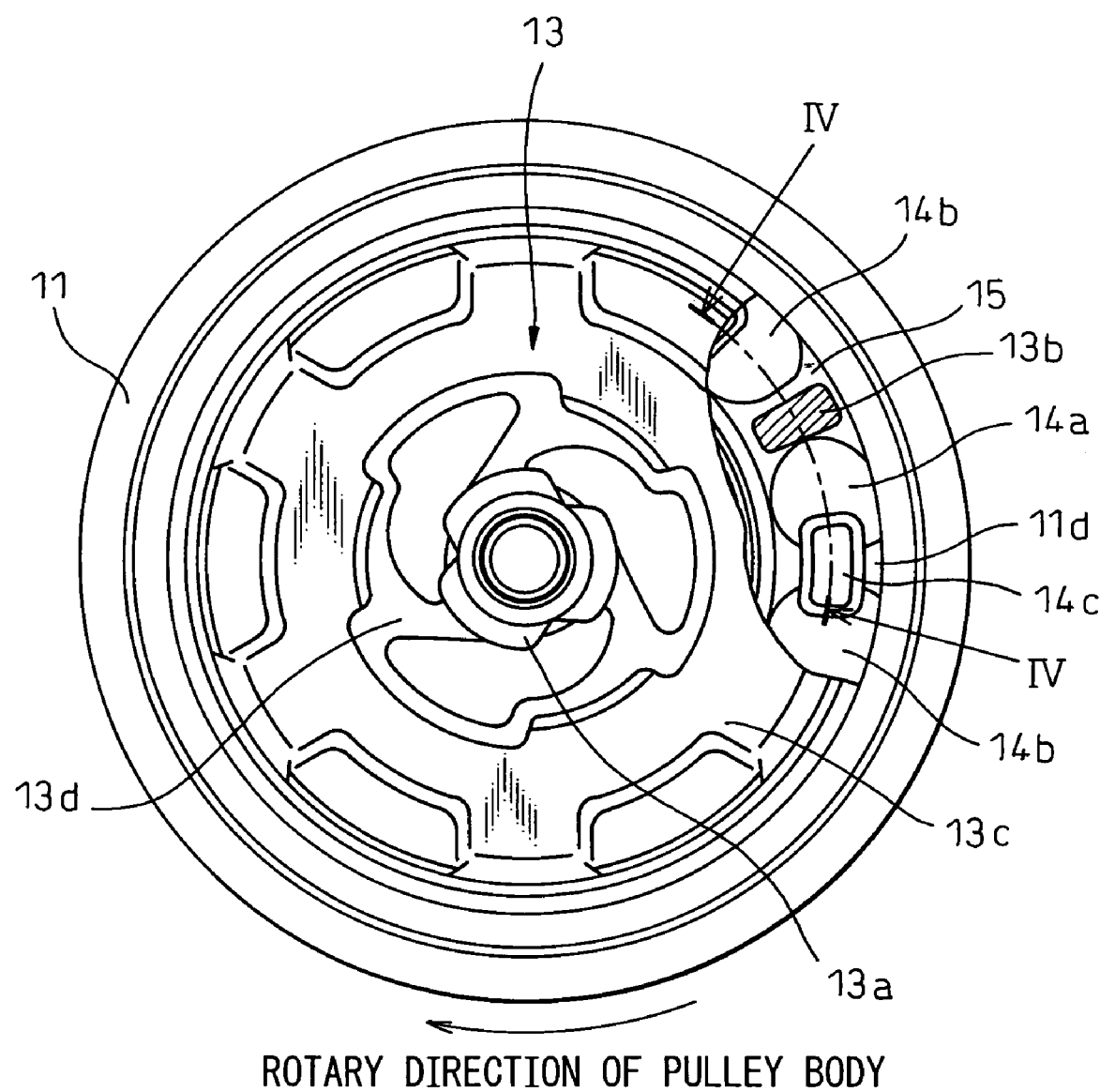
FIG. 3 is a (partially broken) left side view of FIG. 2.
Figure 4:
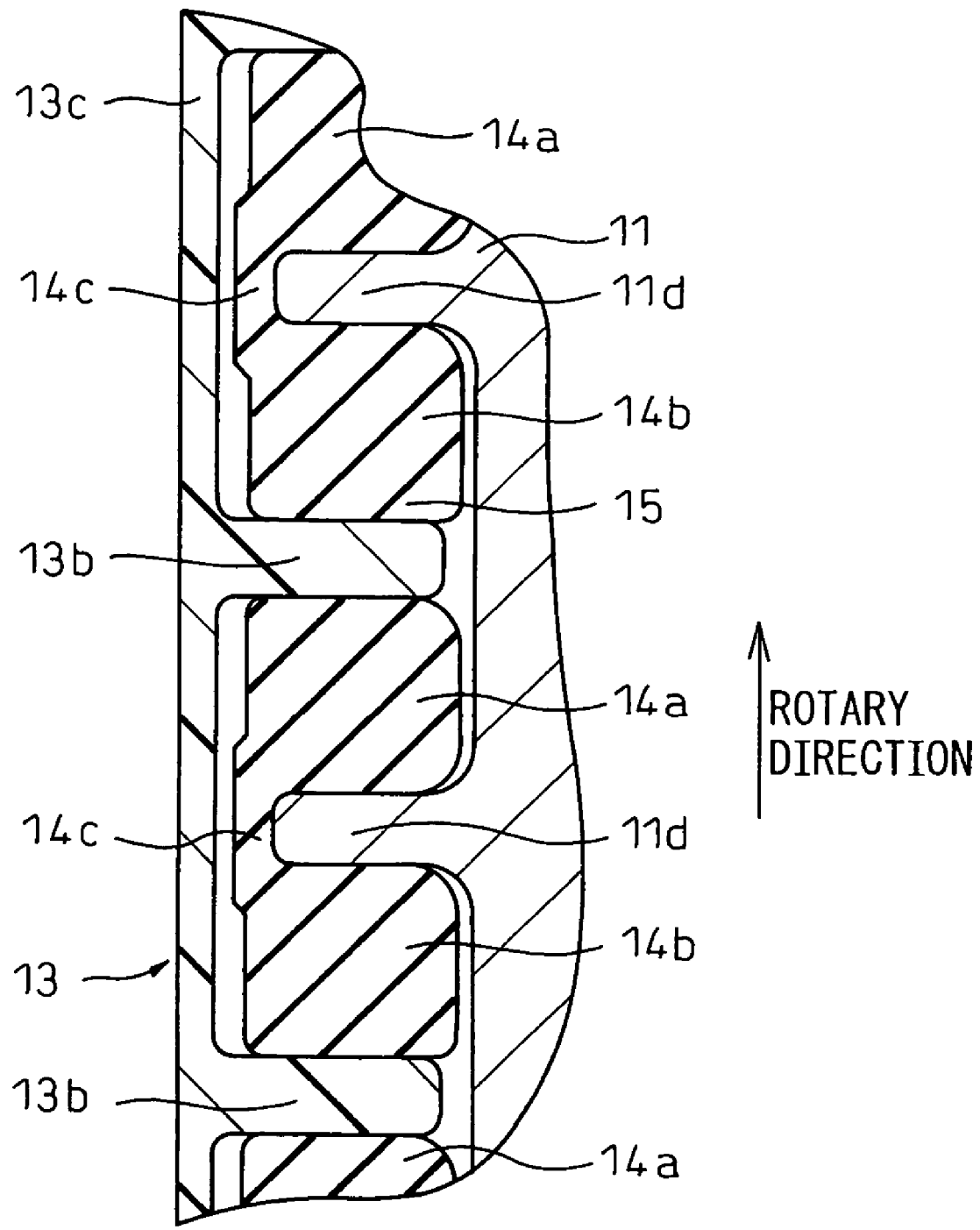
FIG. 4 is a sectional view taken along a line IV-IV in FIG. 3.
Figure 5:
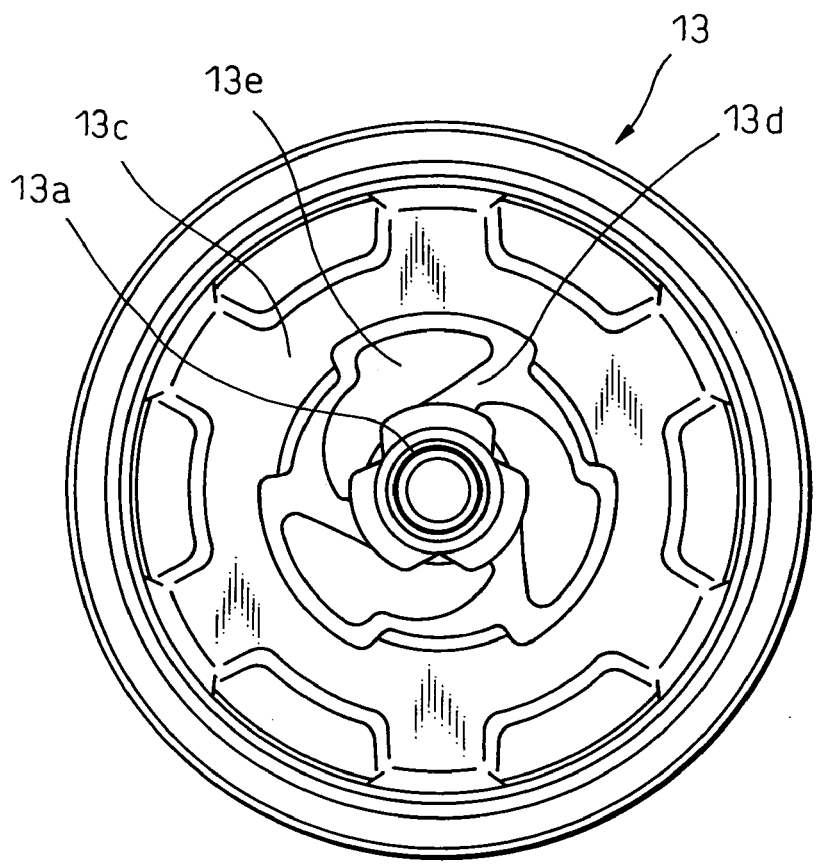
FIG. 5 is a front view of a center hub according to this embodiment of the present invention.
Figure 6:
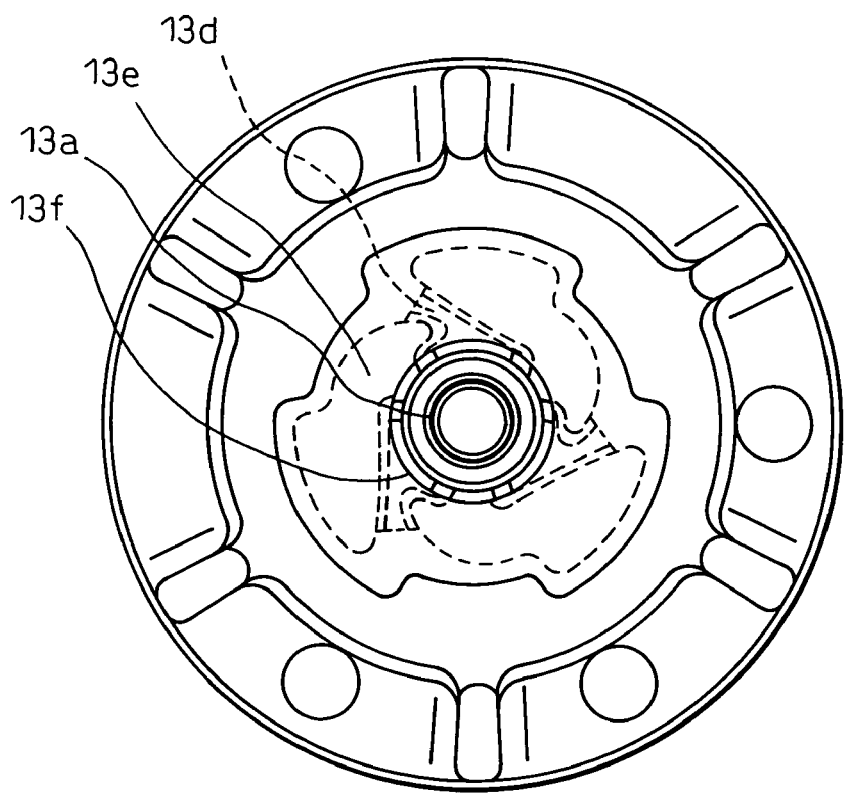
FIG. 6 is a back view of the center hub according to this embodiment of the present invention.

FIG. 2A is a sectional view of the pulley according to this embodiment; FIG. 2B is an enlarged view of a region A thereof; FIG. 3 is a (partially broken) left side view of FIG. 2; FIG. 4 is a sectional view taken along a line IV-IV in FIG. 3; FIG. 5 is a front view of a center hub 13 according to this embodiment; and FIG. 6 is a back view of the center hub 13.

In FIG. 2A, a pulley body 11 is a generally cylindrical body of metal or hard resin (in this embodiment, phenolic resin) rotatable by a torque transmitted from the engine 6 via the V-belt. A cylindrical pulley hub 11a for mounting a radial bearing 12 for supporting the pulley body 11 in a rotatable manner is molded integral with the pulley 10 on the inner circumferential side thereof. In this regard, an inner ring of the radial bearing 12 is press-fit in a front housing 1a of the compressor 1.

According to this embodiment, as a pulley of a poly-drive belt correspondence type is adopted as the pulley body 11 and the pulley body 11 is made of resin, a sleeve 11c made of metal is integral with a pulley hub 11a by the insert molding on the inner circumferential side of the pulley hub 11a to which the bearing 12 is mounted.

The center hub 13 is a rotary body coupled to a shaft 1b of the compressor 1 to be rotated together therewith. As shown in FIGS. 2A to 4, the center hub 13 is formed of a boss section 13a having a female thread engageable with a male thread formed on the outer circumference of the shaft 1b, a plate section 13c having a plurality of projections 13b projected toward the pulley body 11 to receive a torque supplied from the pulley body 11, and a bridge section 13d for mechanically coupling the plate section 13c with the boss section 13a to transmit the torque from the plate section 13c to the boss section 13a, having only enough strength so that the bridge section 13d is broken when the torque to be transmitted exceeds a predetermined value. In this embodiment, the boss section 13a and the plate section 13c correspond to an output section and an input section, respectively, defined by a scope of claim for patent.

In this regard, the boss section 13a and the bridge section 13d are molded integral with each other by the sintering of a metallic powder, the plate section 13c is molded with resin, and the bridge section 13d and the plate section 13c are made integral with each other by insert molding.

A plate 13e is a disk-like retaining means in case of the breakage of the bridge section 13d, fixed to the plate section 13c on the outer diameter side and having an engagement part 13g to be engaged with a shoulder 13f formed in the boss section 13a on the inner diameter side.

More concretely, an aperture having a diameter $\phi 2$ smaller than that $\phi 1$ of the shoulder 13f is provided on the inner diameter side of the metallic plate 13e, and the outer diameter side of the plate 13e is integral with the plate section 13c together with the bridge section 13d by the insert-molding, while the boss section 13a is inserted into the aperture.

Also, as shown in FIG. 4, in a portion of the pulley body 11 corresponding to the plate section 13c, there are a plurality of projections 11d projected from the pulley body 11 to be integral therewith toward the plate section 13c; i.e., the center hub 13, so that the projections 13b of the center hub 13 and the projections 11d of the pulley body 11 are alternately positioned around the shaft 1b in the rotating direction of the shaft 1b and intermeshed with each other when the pulley body 11 and the center hub 13 are mounted to the compressor 1.

First and second dampers 14a and 14b are interposed between both the projections 11d and 13b. The first and second dampers 14a and 14b are torque transmission members made of elastically deformable material (for example, EPDM (ethylene-propylene terpolymer)).

The first damper 14a transmits the torque from the projections 11d of the pulley body 11 to the projections 13b of the center hub 13 by the compressive deformation due to the application of the compressive load as the pulley body 11 rotates relative to the center hub 13 when the compressor 1 is driven.

On the other hand, the second damper 14b is compressively deformed due to the application of the compressive load when the pulley body 11 rotates relative to the center hub 13 reverse to the normal rotation (hereinafter referred to as the reverse direction). Both the dampers 14a and 14b are coupled to each other by a coupling member 14c to form a pair, and a plurality of such pairs are arranged in the circumferential direction.

Next, a characteristic performance of the torque transmission device (the pulley 10) according to this embodiment will be described.

When the engine 6 starts, the pulley body 11 is made to rotate in the normal direction relative to the center hub 13, and the first damper 14a is compressed, the repulsive force of which is transmitted to the center hub 13 as the torque.

At this time, the phase difference of the rotary angle between the pulley body 11 and the center hub 13 due to the torque variation generated in the engine 6 and the load variation generated in the compressor 1 is absorbed by the elastic deformation of the first and second dampers 14a and 14b.

If the torque transmitted between the pulley body 11 and the center hub 13 exceeds the predetermined value, the bridge section 13*d* is broken to interrupt the torque transmission between the pulley body 11 and the center hub 13. That is, according to this embodiment, the bridge section 13*d* forms a torque limiter section for interrupting the torque transmission when the torque to be transmitted exceeds a predetermined value.

At this time, the projections 11*d* and 13*b* are merely intermeshed with each other via both the dampers 14*a* and 14*b* on the plate section 13*c* side in the center hub 13, which state is maintained solely by the retaining force generated because the boss section 13*a* is formed integral with the shaft 1*b*. When the bridge section 13*d* is broken, the plate section 13*c* moves leftward as shown in FIG. 7A from the position in FIG. 2A, and thus the center hub 13 tends to be detached.

However, as the engagement part 13*g* of the plate 13*e* is engaged with the shoulder 13*f* of the boss section 13*a*, the plate section 13*c* is engagingly coupled with the boss section 13*a* while the torque transmission is interrupted. Accordingly, even if the bridge section 13*d* is broken, the boss section 13*a* as well as the plate section 13*c* are prevented from being detached from the pulley 10.

Next, the operation and effect of this embodiment will be described.

According to this embodiment, as the plate 13*e* forming the detachment-preventing means is integral with the center hub 13, that is, the pulley 10, it is possible to reduce the number of processes necessary for the production of the pulley 10 in comparison with the invention described in Japanese Unexamined Patent Publication No. 2002-349596 in which the detachment-preventing means is structured by using a separate stop ring, and also to ease the overhaul and maintenance.

In the above-mentioned embodiment, while the plate 13*e* is formed integral with the center hub 13 by the insert molding when the center hub 13 is molded, the present invention should not be limited thereto. For example, the plate 13*e* may be integral with the center hub 13 with screws or rivets, or the center hub 13 including the plate 13*e* is molded as a whole as a single part.

While retaining means in case of the breakage of the bridge section 13*d* is formed of the disk-like plate 13*e* in the above-mentioned embodiment, the present invention should not be limited thereto. For example, the plate section 13*c* may be coupled to the boss section 13*a* by a wire like a wire type ski-tying means tying the ski to the skier for the ski retention device. In such a case, it is necessary so that no torque is applied to the wire forming the retaining means at the breakage.

Also, according to the above embodiment, as the boss section 13*a* remains in the pulley 10 without being detached therefrom but, instead, the plate section 13*c* is detached from the pulley 10, the plate section 13*c* side of the plate 13*e* is fixed to the plate section 13*c* and the engagement part 13*g* is provided on the boss section 13*a* side. If it is contemplated that the boss-section 13*a* remains in the pulley 10 without being detached therefrom but the plate section 13*c* is detached from the pulley 10 when the bridge section 13*d* is broken, the engagement part 13*g* may be provided on the plate section 13*c* side of the plate 13*e* and the boss section 13*a* side may be fixed to the boss section 13*a*.

While the invention has been described by reference to specific embodiments chosen for the purpose of illustration, it should be apparent that numerous modifications could be made thereto, by those skilled in the art, without departing from the basic concept and scope of the invention.

The invention claimed is:

1. A torque transmission device comprising:
an input section for receiving a torque from a driving machine;
an output section coupled to the driven machine:
a bridge section for coupling the input section to the output section to transmit the torque from the input section to the output section, wherein the bridge section is broken when the torque to be transmitted exceeds a predetermined value to interrupt the torque transmission; and
a retainer fixed to the input section for coupling the input section to the output section when the bridge section is broken, wherein
the input section includes a plurality of projections. which are intermeshed with projections of a pulley, and at least one elastically deformable member is located between the projections of the input section and the projections of the pulley,
the output section is coupled to a shaft of the driven machine such that the output section and the shaft rotate together, and
the retainer includes a plate extending from the input section and engaging with the output section when the bridge section is broken.

2. A torque transmission device as defined by claim 1, wherein
the output section is fixed to the shaft to be integral therewith,
the input section is intermeshed with a drive side rotary part rotated by receiving the torque from the driving machine and is made to rotate together with the drive side rotary part, and the intermeshed state is retained by a retaining force generated because the output section is formed integral with the shaft, and
the retainer, in case of the breakage of the bridge section, is fixed with the input section and engaged with the output section when the bridge section is broken.

3. A torque transmission device comprising:
an input section for receiving a torque from a driving machine;
an output section coupled to the driven machine;
a bridge section for coupling the input section to the output section to transmit the torque from the input section to the output section, wherein the bridge section is broken when the torque to be transmitted exceeds a predetermined value to interrupt the torque transmission; and
a retainer for coupling the input section to the output section when the bridge section is broken without transmitting torque between the input section and the output section, wherein
the input section includes a plurality of projections, which are intermeshed with projections of a pulley, and at least one elastically deformable member is located between the projections of the input section and the projections of the pulley,
the output section is coupled to a shaft of the driven machine such that the output section and the shaft rotate together, and
the retainer includes a plate extending from the input section and engaging with the output section when the bridge section is broken.

* * * * *